US009783241B2

(12) United States Patent
Ishihara (10) Patent No.: US 9,783,241 B2
(45) Date of Patent: Oct. 10, 2017

(54) VEHICLE BODY REAR PART STRUCTURE

(71) Applicant: HONDA MOTOR CO., LTD., Tokyo (JP)

(72) Inventor: Takehiro Ishihara, Aisai (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/029,709

(22) PCT Filed: Oct. 2, 2014

(86) PCT No.: PCT/JP2014/076389
§ 371 (c)(1),
(2) Date: Apr. 15, 2016

(87) PCT Pub. No.: WO2015/056572
PCT Pub. Date: Apr. 23, 2015

(65) Prior Publication Data
US 2016/0264184 A1    Sep. 15, 2016

(30) Foreign Application Priority Data

Oct. 18, 2013    (JP) .................................. 2013-217630

(51) Int. Cl.
*B62D 25/08*    (2006.01)
*B23K 11/00*    (2006.01)
(Continued)

(52) U.S. Cl.
CPC ............. *B62D 25/08* (2013.01); *B23K 11/00* (2013.01); *B23K 11/11* (2013.01); *B62D 25/04* (2013.01);
(Continued)

(58) Field of Classification Search
CPC ...... B62D 25/04; B62D 27/023; B62D 25/08; B62D 25/087; B23K 11/11; B23K 11/00
(Continued)

(56) References Cited

U.S. PATENT DOCUMENTS 4,973,103 A * 11/1990 Imajyo .................. B62D 25/02
296/191
4,982,994 A *  1/1991 Sekiguchi ............ B62D 25/087
296/203.03
(Continued)

FOREIGN PATENT DOCUMENTS

JP    03-016881    1/1991
JP    08-067271    3/1996
(Continued)

OTHER PUBLICATIONS

International Search Report, Date of mailing: Dec. 22, 2014 (Dec. 22, 2014).

*Primary Examiner* — Pinel Romain
(74) *Attorney, Agent, or Firm* — Rankin, Hill & Clark LLP (57) ABSTRACT

In a vehicle body rear part structure, a plurality of first spot weld parts that join the rear panel inner flange and the rear panel outer flange by spot welding are provided at a first weld pitch; a plurality of second spot weld parts that join together the rear pillar inner flange and the rear pillar outer flange by spot welding are provided at a second weld pitch; at the corner part, a plurality of third spot weld parts that join together, by spot welding, regions of the rear panel inner flange, the rear panel outer flange, the rear pillar inner flange, and the rear pillar outer flange where at least three of the flanges overlap with one another are provided at a third weld pitch; and the third weld pitch is set to be shorter than the first weld pitch and the second weld pitch.

6 Claims, 7 Drawing Sheets

(51) Int. Cl.
- *B62D 25/04* (2006.01)
- *B23K 11/11* (2006.01)
- *B62D 27/02* (2006.01)
- *B23K 101/00* (2006.01)

(52) U.S. Cl.
CPC ......... *B62D 25/087* (2013.01); *B62D 27/023* (2013.01); *B23K 2201/006* (2013.01)

(58) Field of Classification Search
USPC ....................................................... 296/204
See application file for complete search history.

(56) References Cited

U.S. PATENT DOCUMENTS 6,364,405 B1 * 4/2002 Kim .................... B62D 25/087
296/203.01
2008/0246312 A1 10/2008 Katoh

FOREIGN PATENT DOCUMENTS

| JP | 10-244965 | 9/1998 |
|----|-----------|--------|
| JP | H11-192970 | 7/1999 |
| JP | 2000-103363 | 4/2000 |
| JP | 2004-149085 | 5/2004 |
| JP | 2008-254653 | 10/2008 |
| JP | 2012-066654 | 4/2012 |
| JP | 2014-031099 | 2/2014 |

* cited by examiner

VEHICLE BODY REAR PART STRUCTURE

TECHNICAL FIELD

The present invention relates to a vehicle body rear part structure.

Priority is claimed on Japanese Patent Application No. 2013-217630, filed on Oct. 18, 2013, the contents of which are incorporated herein by reference.

BACKGROUND

In the related art, a vehicle is known which includes a door opening part (backdoor opening part) and in which a backdoor for opening and closing the door opening part is provided. The door opening part is formed by a roof panel that is arranged at an upper position in the gravity direction of a vehicle body, a rear panel (lower back) that is arranged at a lower position in the gravity direction of the vehicle body, and a rear pillar that is arranged at both outer sides in the vehicle width direction of the roof panel and the rear panel and is provided along the vertical direction in the gravity direction so as to connect the roof panel and the rear panel as a main configuration.

The door opening part is a relatively large opening in the vehicle body and is arranged in the vicinity of a rear suspension, and therefore, the door opening part is a region on which stress is easily concentrated. A mode deformation in which the opening is twisted due to the stress concentration occurs, and steering stability, noise, and vibration performances of the vehicle are negatively impacted.

Further, when an impact is applied to the periphery of the door opening part such as a rear impact case, it is desirable to prevent deformation of the door opening part as far as possible from the viewpoint of safety.

Above all, a corner part that is a joint part between the rear panel and the rear pillar is easily deformed due to stress concentration during impact.

Therefore, a variety of techniques have been proposed in order to enhance the rigidity of the corner part.

For example, in Patent Document 1, a reinforcement is arranged at an inner portion of the corner part, an outer edge of an upper part of the reinforcement is joined to a joint part between an outer edge of a roof panel and an inner edge of a roof side outer, and an inner edge of the upper part of the reinforcement is joined to a joint part between an outer edge of a backdoor opening inner and an inner edge of a roof side inner. Further, an outer edge of a lower part of the reinforcement is joined to a rear end part of the roof side outer, and an inner edge of the lower part of the reinforcement is joined to a backdoor opening flange or a peripheral part of the backdoor opening flange.

RELATED ART DOCUMENTS

Patent Documents

[Patent Document 1] Japanese Unexamined Patent Application, First Publication No. H10-244965

SUMMARY OF INVENTION

Problems to be Solved by the Invention

However, in the related art described above, although the technique is superior in that the rigidity of the corner part is enhanced, the reinforcement is arranged at the inner portion of the corner part, and therefore, there is a problem in that the vehicle body weight is increased.

In view of the foregoing, an object of an aspect of the present invention is to provide a vehicle body rear part structure capable of enhancing the rigidity of a corner part without increasing the vehicle body weight.

Means for Solving the Problem

A vehicle body rear part structure according to an aspect of the present invention employs the following configurations in order to achieve the above object.

(1) A vehicle body rear part structure according to an aspect of the present invention includes: a rear panel that extends in a vehicle width direction at a vehicle body rear part; a rear pillar that stands upward from an outer end part in the vehicle width direction of the rear panel; and a corner part that is formed at a joint part between the rear panel and the rear pillar, wherein: a door opening part is formed by the rear panel, the rear pillar, and the corner part; the rear panel includes a rear panel interior on the inner side of a vehicle interior and a rear panel exterior on the outer side of the vehicle interior; the rear pillar includes a rear pillar interior that stands upward in a gravity direction and that has a lower end in the gravity direction which is joined to an outer end part in the vehicle width direction of the rear panel interior, and a rear pillar exterior that stands upward in the gravity direction and that has a lower end in the gravity direction which is joined to an outer end part in the vehicle width direction of the rear panel exterior; the rear panel interior includes a rear panel inner flange that extends toward the vehicle body rear from an upper end part in the gravity direction of the rear panel interior; the rear panel exterior includes a rear panel outer flange that extends along the rear panel inner flange; the rear pillar interior includes a rear pillar inner flange that extends toward the vehicle body rear from an inner end part in the vehicle width direction of the rear pillar interior; the rear pillar exterior includes a rear pillar outer flange that extends along the rear pillar inner flange; a plurality of first spot weld parts that join together the rear panel inner flange and the rear panel outer flange by spot welding are provided at a first weld pitch along a circumferential direction of the door opening part; a plurality of second spot weld parts that join together the rear pillar inner flange and the rear pillar outer flange by spot welding are provided at a second weld pitch along a circumferential direction of the door opening part; at the corner part, a plurality of third spot weld parts that join together, by spot welding, regions of the rear panel inner flange, the rear panel outer flange, the rear pillar inner flange, and the rear pillar outer flange where at least three of the flanges overlap with one another are provided at a third weld pitch along a circumferential direction of the door opening part; and the third weld pitch is set to be shorter than the first weld pitch and the second weld pitch.

(2) In the aspect of the above (1), the rear panel exterior may be configured in a divided manner by a first rear panel exterior on the center side in the vehicle width direction and a second rear panel exterior that is joined to an outer end part in the vehicle width direction of the first rear panel exterior.

(3) In the aspect of the above (2), a plate thickness of the second rear panel exterior may be set to be greater than a plate thickness of the rear pillar exterior and a plate thickness of the first rear panel exterior.

(4) In the aspect of the above (2), the outer end part in the vehicle width direction of the second rear panel exterior may extend upward in the gravity direction and more outward in the vehicle width direction than the outer end part in the vehicle width direction of the rear panel interior, and the third spot weld part may be provided at the outer end part of the second rear panel exterior in a state where the outer end part of the second rear panel exterior is interposed between the rear pillar interior and the rear pillar exterior.

(5) In the aspect of the above (3), the outer end part in the vehicle width direction of the second rear panel exterior may extend upward in the gravity direction and more outward in the vehicle width direction than the outer end part in the vehicle width direction of the rear panel interior, and the third spot weld part may be provided at the outer end part of the second rear panel exterior in a state where the outer end part of the second rear panel exterior is interposed between the rear pillar interior and the rear pillar exterior.

(6) In the aspect of any one of the above (1) to (5), a bead may be formed in the vicinity of each of the rear panel inner flange, the rear panel outer flange, the rear pillar inner flange, and the rear pillar outer flange along the extending direction of each flange.

Advantage of the Invention

According to the aspect of the above (1), at the corner part, at least three flanges of the rear panel inner flange, the rear panel outer flange, the rear pillar inner flange, and the rear pillar outer flange are overlapped with one another to be welded by spot welding, and therefore, the rigidity of the corner part can be enhanced.

Further, the spot weld pitch (weld pitch of the third spot weld part, third weld pitch) of the corner part is set to be shorter than the weld pitch (first weld pitch) of the first spot weld part and the weld pitch (second weld pitch) of the second spot weld part. Therefore, at the corner part, it is possible to distribute an impact received from the outside, to the spot weld parts at further narrow intervals. That is, it is possible to effectively distribute an impact received from the outside and enhance the resistance of the corner part against the impact.

Accordingly, it is not necessary to provide a reinforcement member such as the reinforcement of the related art, and therefore, it is possible to enhance the rigidity of the corner part without increasing the vehicle body weight.

According to the aspect of the above (2), when the rear panel exterior is processed by a press working, the rear panel exterior is configured in a divided manner, and thereby it is possible to reduce a blank when a base material is cut compared to a case where the rear panel exterior is not configured in a divided manner. As a result, it is possible to reduce the area of a dead space when the rear panel exterior is processed by a press working. Accordingly, it is possible to provide a rear panel exterior having a good yield rate at a press working.

Further, the plate thicknesses of the first rear panel exterior and the second rear panel exterior can be different from each other.

For example, it is possible to thicken the plate thickness of the second rear panel exterior that requires relatively high rigidity and strength since the second rear panel exterior configures the corner part of the door opening part to improve the rigidity and strength, and it is possible to thin the plate thickness of the first rear panel exterior that requires low rigidity and strength to reduce the weight.

According to the aspect of the above (3), it is possible to thicken the plate thickness of the second rear panel exterior that requires relatively high rigidity and strength to improve the rigidity and strength, and it is possible to thin the plate thickness of the first rear panel exterior that requires low rigidity and strength to reduce the weight.

According to the aspect of the above (4), the divided second rear panel exterior is extended outward in the vehicle width direction. Thereby, a shape having a good yield rate can be obtained, and it is possible to reduce costs.

That is, when a rear panel interior that is not divided is extended outward in the vehicle width direction and upward in the gravity direction, or when the rear pillar interior or the rear pillar exterior is extended inward in the vehicle width direction and downward in the gravity direction, a shape having a bad yield rate is obtained. When the rear panels are formed, the area of a dead space of a blank when a base material is cut is enlarged. As a result, material costs are increased.

However, according to the aspect of the above (4), the second rear panel exterior can be made to have a shape having a good yield rate, and it is possible to reduce costs.

According to the aspect of the above (5), the second rear panel exterior having a large plate thickness is interposed between the rear pillar interior and the rear pillar exterior and is welded by the third spot weld parts having a shorter pitch compared to the first spot weld part and the second spot weld part, and thereby it is possible to further improve the rigidity and strength at the corner part.

According to the aspect of the above (6), it is possible to improve the rigidity and strength of the flanges by the bead.

DESCRIPTION OF THE EMBODIMENTS (Vehicle Body Frame)

Next, an embodiment of the present invention will be described based on the drawings.

Figure 1:
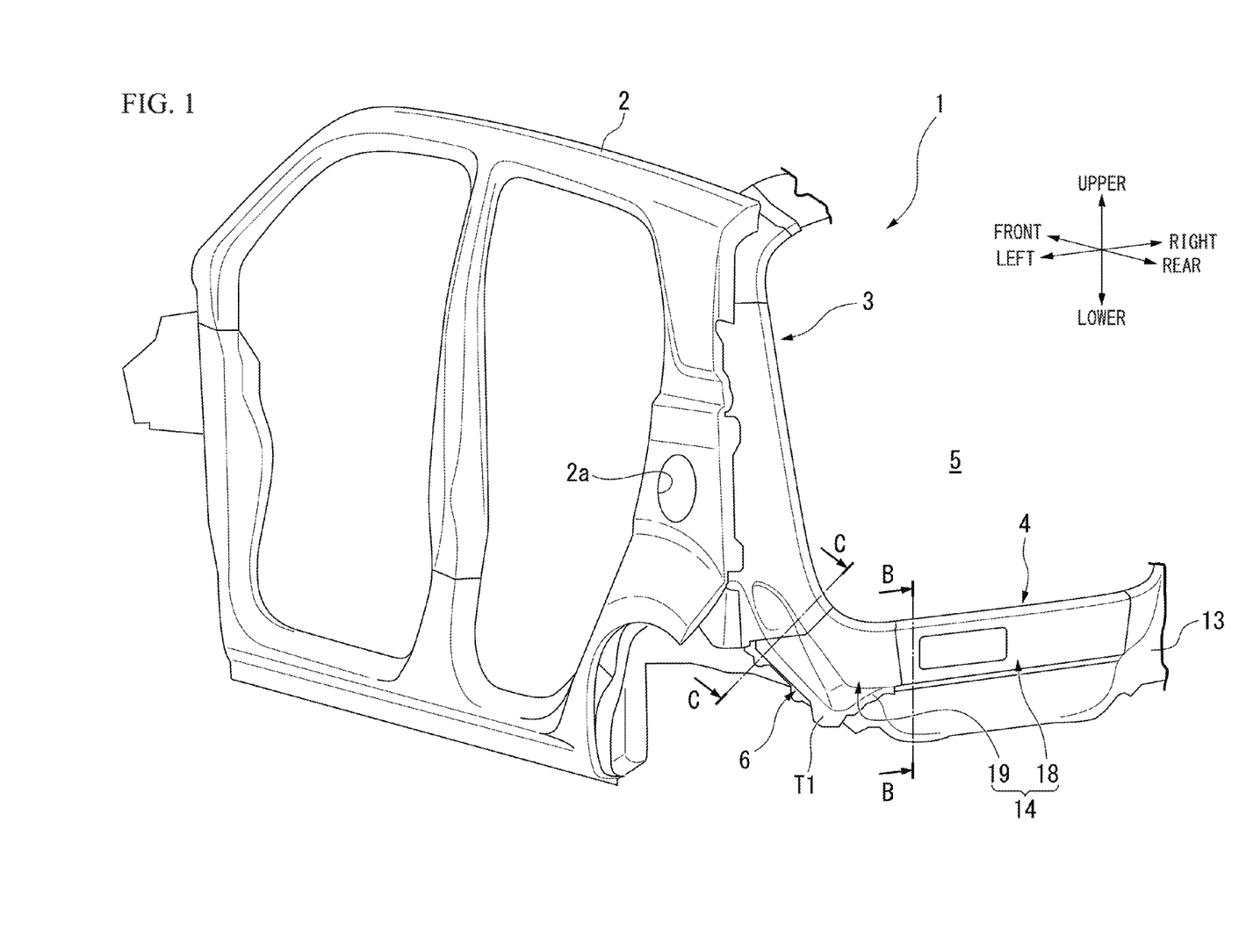
FIG. 1 is a perspective view of a vehicle body according to an embodiment of the present invention seen from the diagonally rearward left.

FIG. 1 is a perspective view of a vehicle body 1 seen from the diagonally rearward left. Note that, in the following description, a direction such as front-to-rear, vertical, and right-to-left directions is the same as a direction of the vehicle body 1 if there is no particular description. That is, in the following description, the frontward direction in a vehicle travel direction is referred to simply as a frontward direction, the rearward direction in a vehicle travel direction is referred to simply as a rearward direction, the rightward direction in a vehicle width direction seen from a driving seat is referred to simply as a rightward direction, the leftward direction in a vehicle width direction is referred to simply as a leftward direction, the upward direction in the gravity direction is referred to simply as an upward direction, and the downward direction in the gravity direction is referred to simply as a downward direction. Further, the vehicle body 1 is configured to be symmetric in the right-to-left direction. In the following description, only the left side from the center in the vehicle width direction of the vehicle body 1 is described, and the description of the right side is omitted.

As shown in FIG. 1, the vehicle body 1 is a so-called wagon-type vehicle body. The vehicle body 1 includes a body side panel 2 that configures right and left exterior designs of the vehicle body 1, a rear pillar 3 that is arranged at the right and left of a rear part of the body side panel 2 and extends in the vertical direction, and a rear panel 4 that extends in the vehicle width direction so as to bridge a space between lower ends of the right and left rear pillars 3.

A door opening part 5 is formed by joining together a lower end of the rear pillar 3 and an outer end in the vehicle width direction of the rear panel 4. A joint part between the rear pillar 3 and the rear panel 4 and the vicinity of the joint part are configured as a corner part 6. Note that, the door opening part 5 is configured so as to be opened and closed by a backdoor (not shown).

The body side panel 2 is formed so as to cover a vehicle body frame (not shown) that is provided at the right and left of the vehicle body 1 from the vehicle width outward direction. The vehicle body frame covered by the body side panel 2 is configured by a roof side rail (not shown) that is arranged at an upper part of the vehicle body 1 and extends in the front-to-rear direction, a front pillar inner (not shown) that extends diagonally downward from a front end of the roof side rail, a center pillar inner (not shown) that extends downward from the center in the front-to-rear direction of the roof side rail, a rear quarter pillar inner (not shown) that extends downward from a rear end of the roof side rail, and a rear pillar 3 that is arranged at a more rearward position than the rear quarter pillar inner. Further, a fuel port 2a is formed between the rear pillar 3 and the rear quarter pillar inner of the body side panel 2.

(Rear Pillar)

Figure 2:
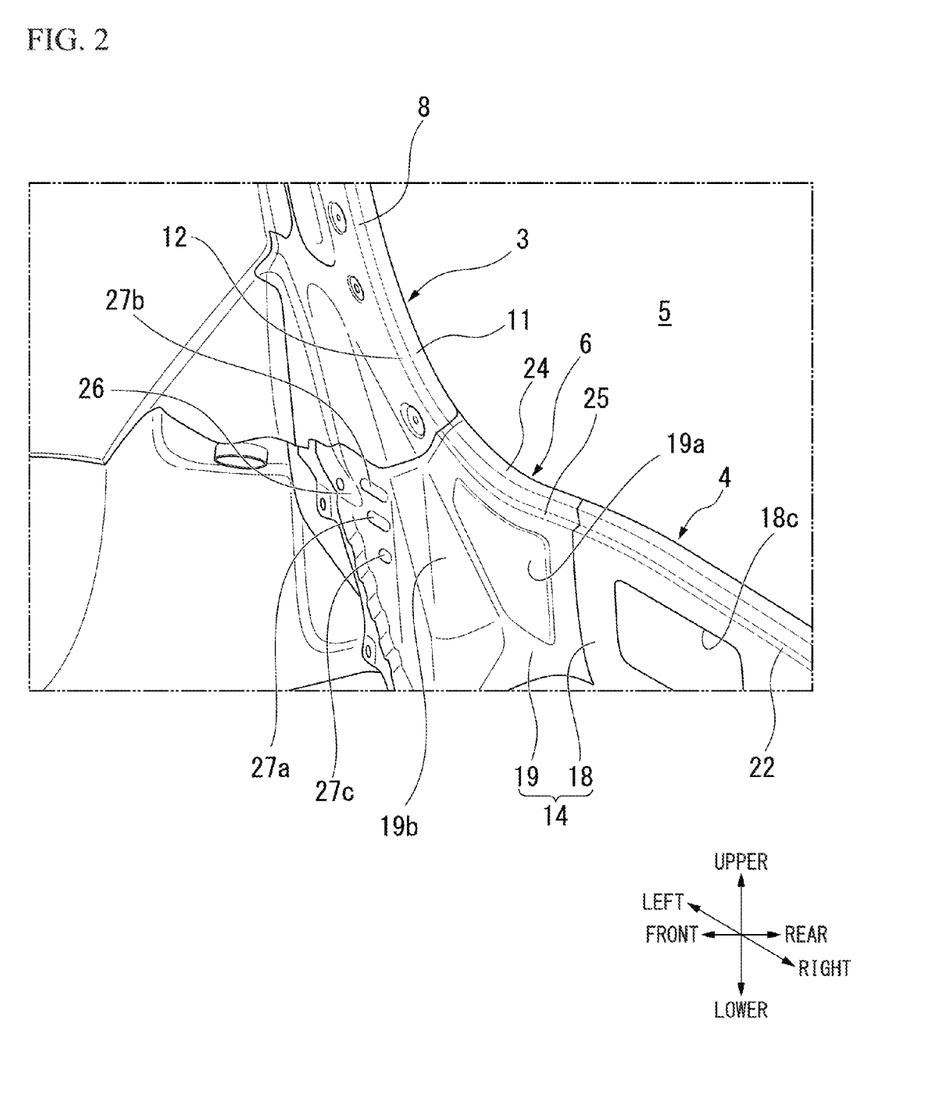
FIG. 2 is an enlarged view of a corner part.
Figure 3:
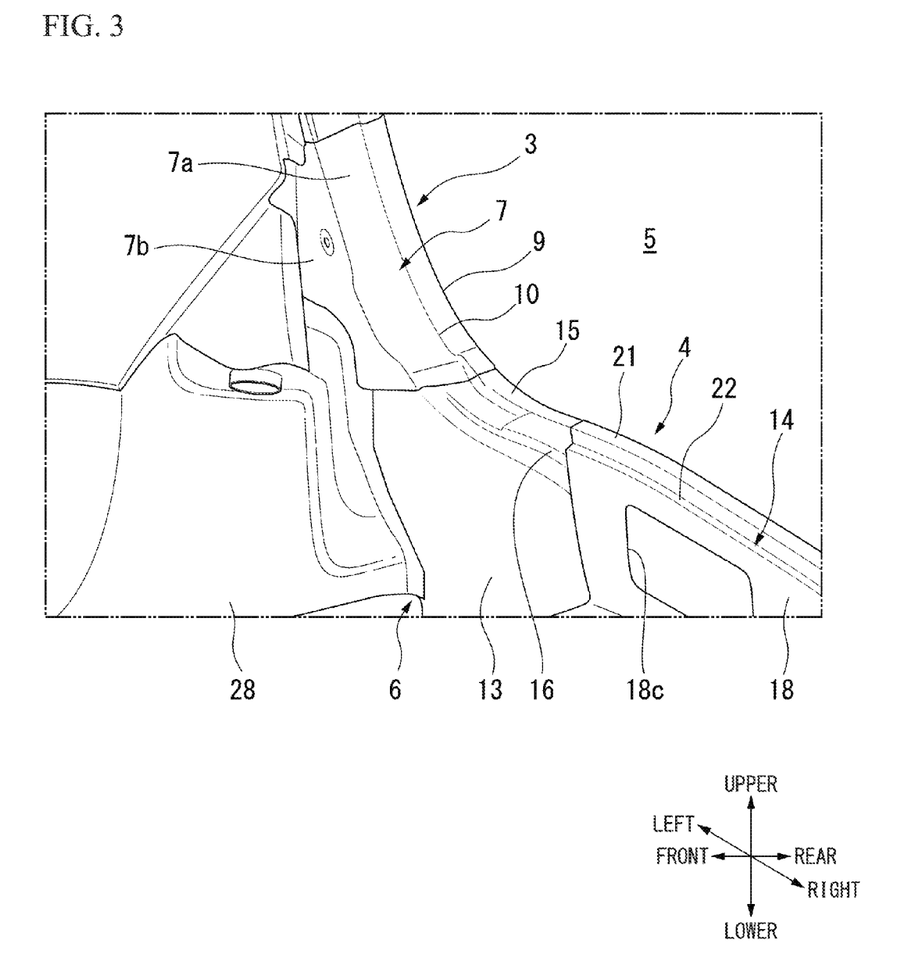
FIG. 3 is a perspective view showing a state where outers are detached from the state of FIG. 2.

FIG. 2 is an enlarged view of the corner part 6 of FIG. 1. FIG. 3 is a perspective view showing a state where outers are detached from the state of FIG. 2.

As shown in FIG. 1 to FIG. 3, the rear pillar 3 is configured by a rear pillar interior 7 that is provided on the inner side of a vehicle interior and a rear pillar exterior 8 that is provided on the outer side of the vehicle interior. The rear pillar 3 has a closed cross-sectional structure that is formed by the rear pillar interior 7 and the rear pillar exterior 8.

The rear pillar interior 7 is a member that is formed by applying a press working to a metal plate to have a substantially crank-shaped cross-section. That is, the rear pillar interior 7 is formed by a front piece (not shown), a rear piece 7a that is arranged at a more inward position in the vehicle width direction than the front piece, and a step difference piece 7b that joins together the front piece and the rear piece 7a which are continuously arranged. The rear pillar interior 7 is arranged such that the surface direction of the front piece and the surface direction of the rear piece 7a are directed in the front-to-rear direction and the vertical direction of the vehicle body 1 and such that the surface direction of the step difference piece 7b is directed in the vehicle width direction.

A lower part of the rear pillar interior 7 is formed to be slightly curved inward in the vehicle width direction. The region that is formed to be curved configures part of the corner part 6. Further, a rear pillar inner flange 9 is formed to extend rearward at a side edge part of the rear piece 7a of the rear pillar interior 7. Further, a bead 10 is formed in the extending direction (vertical direction) of the rear pillar inner flange 9 at the side edge part of the rear piece 7a.

The rear pillar exterior 8 is formed by applying a press working to a metal plate to have a plate shape and is arranged such that the surface direction of the rear pillar exterior 8 is directed in the vehicle width direction and the vertical direction. The plate thickness of the rear pillar exterior 8 is set to, for example, 0.6 mm. Note that, the numerical value of the plate thickness of the rear pillar exterior 8 is an example and is not limited thereto.

A lower part of the rear pillar exterior 8 is formed to be slightly curved inward in the vehicle width direction so as to correspond to the lower part of the rear pillar interior 7. The region that is formed to be curved also configures part of the corner part 6.

A rear pillar outer flange 11 is formed to extend rearward at a side edge part on the inner side in the vehicle width direction of the rear pillar exterior 8. In other words, the rear pillar outer flange 11 extends along the rear pillar inner flange 9. The rear pillar inner flange 9 and the rear pillar outer flange 11 are overlapped with each other and are joined to each other by spot welding. Note that, the details of spot welding are described later.

Further, a bead 12 is formed in the extending direction (vertical direction) of the rear pillar outer flange 11 at the side edge part on the inner side in the vehicle width direction of the rear pillar exterior 8.

(Rear Panel)

Figure 4:
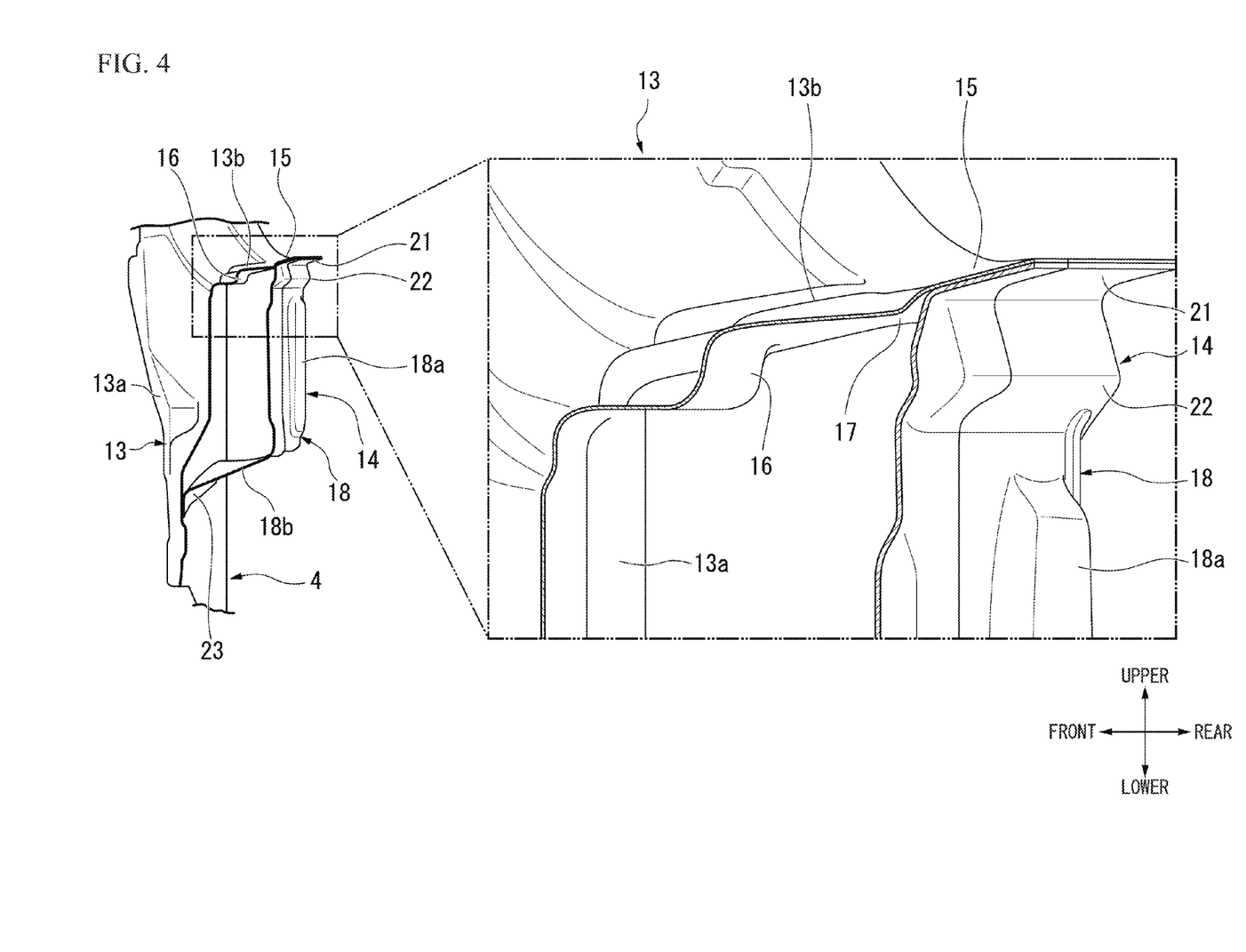
FIG. 4 is a cross-sectional view along a B-B line of FIG. 1.

FIG. 4 is a cross-sectional view along a B-B line of FIG. 1.

As shown in FIG. 2 to FIG. 4, the rear panel 4 is configured by a rear panel interior 13 that is provided on the inner side of the vehicle interior and a rear panel exterior 14 that is provided on the outer side of the vehicle interior. The rear panel 4 has a closed cross-sectional structure that is formed by the rear panel interior 13 and the rear panel exterior 14.

The rear panel interior 13 is formed by applying a press working to a metal plate to have a substantially L-shaped cross-section. That is, the rear panel interior 13 is configured by a rear panel interior main body 13a which extends in the vehicle width direction and of which surface direction is directed in the vehicle width direction and the vertical direction and an upper piece 13b that extends to be bent rearward from an upper end side edge part of the rear panel interior main body 13a. Further, a rear panel inner flange 15 that extends further rearward is formed at a rear part side edge of the upper piece 13b.

Both outer end parts in the vehicle width direction of the rear panel interior 13 are formed to be slightly curved upward and are formed so as to be joined smoothly and continuously to the lower part of the rear pillar interior 7. Both outer end parts in the vehicle width direction of the rear panel interior 13 are joined by spot welding to the lower part of the rear pillar interior 7. The region that is formed to be curved at both outer end parts in the vehicle width direction of the rear panel interior 13 configures part of the corner part 6.

Beads 16, 17 are formed at the upper piece 13b of the rear panel interior 13 at two positions in the extending direction (vehicle width direction) of the rear panel inner flange 15.

The rear panel exterior 14 is configured in a divided manner by a first rear panel exterior 18 that is arranged at the center in the vehicle width direction and two second rear panel exteriors 19 that are arranged on both sides in the vehicle width direction of the first rear panel exterior 18, that is, at positions corresponding to the corner part 6.

The first rear panel exterior 18 is formed by applying a press working to a metal plate to have a substantially L-shaped cross-section and to have a substantially rectangular shape seen from the rear. That is, the first rear panel exterior 18 is configured by a first rear panel exterior main body 18a which extends in the vehicle width direction and of which surface direction is directed in the vehicle width direction and the vertical direction and a lower piece 18b that extends to be bent frontward from a lower end side edge part of the first rear panel exterior main body 18a. Note that, the plate thickness of the first rear panel exterior 18 is set to, for example, 0.6 mm.

The width in the vertical direction of the first rear panel exterior main body 18a is set to about half of the width in the vertical direction of the rear panel interior main body 13a. An opening part 18c is formed at a slightly more leftward position than the center in the vehicle width direction of the first rear panel exterior main body 18a. The opening part 18c is used when a harness (not shown) or the like is pulled out from the inside of the vehicle interior to the outside of the vehicle interior.

A first rear panel outer flange 21 (rear panel outer flange) that extends to be bent rearward is integrally formed at an upper end side edge part of the first rear panel exterior main body 18a. In other words, the first rear panel outer flange 21 extends along the rear panel inner flange 15. Further, a bead 22 is formed at a slightly more downward position than the upper end side edge part of the first rear panel exterior main body 18a along the extending direction (vehicle width direction) of the first rear panel outer flange 21.

On the other hand, a lower flange 23 that extends to be bent downward is integrally formed at a front end side edge part of the lower piece 18b.

The first rear panel outer flange 21 and the rear panel inner flange 15 are overlapped with each other and are joined to each other by spot welding. On the other hand, the lower flange 23 is overlapped with the rear panel interior main body 13 and is joined to the rear panel interior main body 13 by spot welding at a slightly lower position that the center in the vertical direction of the rear panel interior main body 13.

As shown in FIG. 2, the second rear panel exterior 19 configures the corner part 6. The second rear panel exterior 19 is formed so as to cover the region that is formed to be curved of both of the outer end parts in the vehicle width direction of the rear panel interior 13.

The second rear panel exterior 19 is formed by applying a press working to a metal plate to have a substantially L-shaped cross-section. That is, the second rear panel exterior 19 includes: as seen from the rear, a second rear panel exterior main body 19a that is formed to be curved so as to smoothly join together the first rear panel exterior 18 and the rear pillar exterior 8; and a side piece 19b that extends to be bent frontward from an outer edge in the vehicle width direction of the second rear panel exterior main body 19a. Note that, the plate thickness of the second rear panel exterior 19 is set to, for example, 1 mm.

A second rear panel outer flange 24 (rear panel outer flange) that extends to be bent rearward is integrally formed at an upper end side edge part of the second rear panel exterior main body 19a. The second rear panel outer flange 24 also extends along the rear panel inner flange 15.

A bead 25 is formed at a slightly more downward position than the upper end side edge part of the second rear panel exterior main body 19a along the extending direction of the second rear panel outer flange 24.

As shown in FIG. 1 and FIG. 2, the side piece 19b of the second rear panel exterior 19 is formed such that an apex T1 of a front end side edge part protrudes more downward than a lower side of the first rear panel exterior main body 18a. The position of the apex T1 is configured so as to be substantially matched to a corner part of a rear frame (not shown). Thereby, even when an impact is applied from the rear to the second rear panel exterior 19, the load is distributed to the rear frame (not shown).

A side flange 26 that extends to be bent outward in the vehicle width direction is integrally formed at a front end side edge part of the side piece 19b. Three beads 27a, 27b, and 27c are formed to be arranged in the vertical direction at the side flange 26. The rigidity of the side flange 26 can be enhanced by the beads 27a, 27b, and 27c.

The side flange 26 that is configured in this way is joined to a wheel house inner 28 that is arranged below the rear pillar 3 by spot welding.

Figure 5:
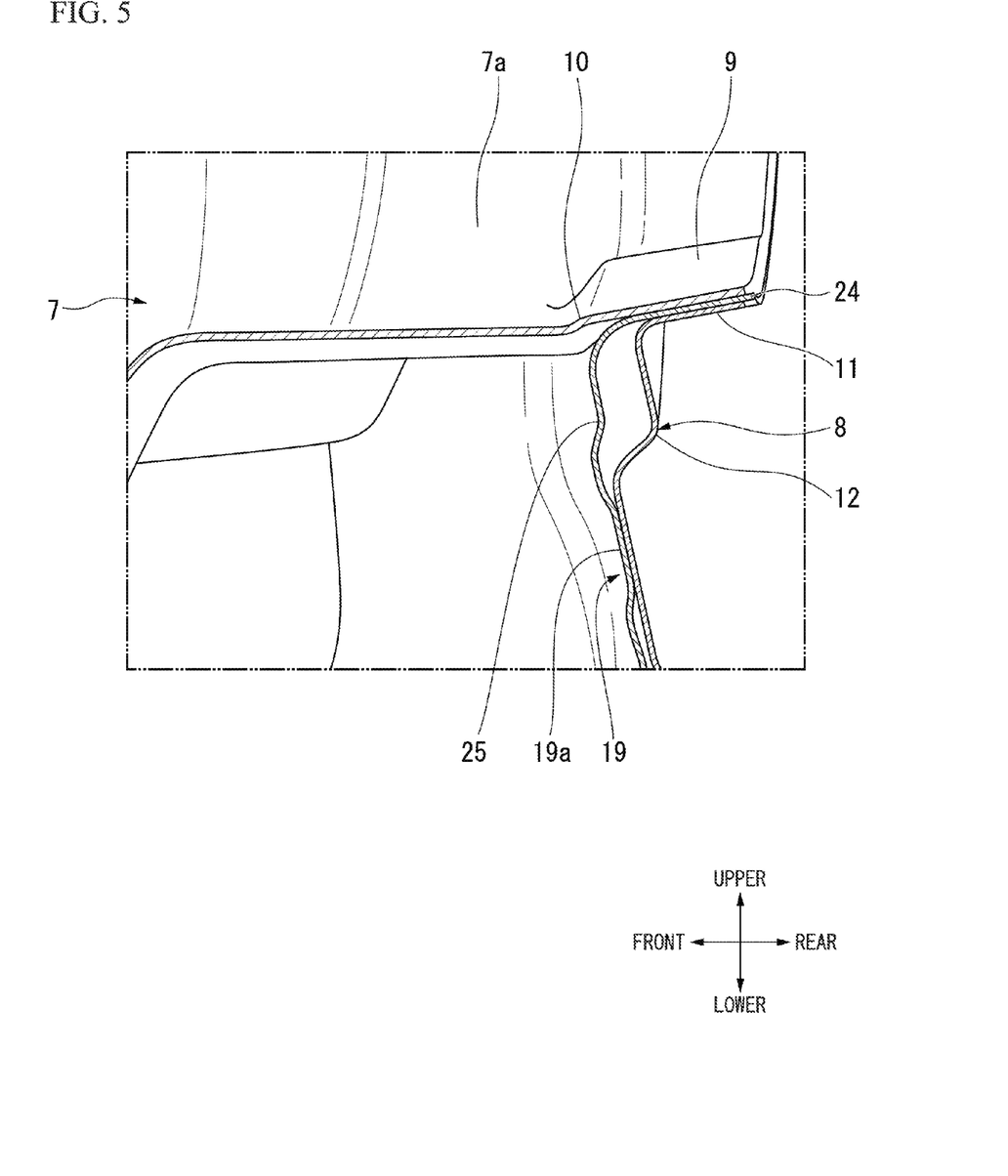
FIG. 5 is a cross-sectional view along a C-C line of FIG. 1.

FIG. 5 is a cross-sectional view along a C-C line of FIG. 1.

As shown in FIG. 5, an end part (outer end part in the vehicle width direction) on the rear pillar 3 side of the second rear panel exterior 19 extends upward along the extending direction of the rear pillar 3 and is in a state where the end part is interposed between the rear pillar interior 7 and the rear pillar exterior 8. That is, the outer end part in the vehicle width direction of the second rear panel exterior 19 extends upward and more outward in the vehicle width direction than the outer end part in the vehicle width direction of the rear panel interior 13 and is in a state where the outer end part in the vehicle width direction of the second rear panel exterior 19 is interposed between the rear pillar interior 7 and the rear pillar exterior 8.

In such a configuration, three flanges 9, 24, and 11 are in a state where the flanges are overlapped to one another in the order of the rear pillar inner flange 9, the second rear panel outer flange 24, and the rear pillar outer flange 11 from the vehicle interior side. Three of the rear pillar inner flange 9, the second rear panel outer flange 24, and the rear pillar outer flange 11 are collectively joined to one another by spot welding.

(Joint State by Spot Welding of Flange)

Figure 6:
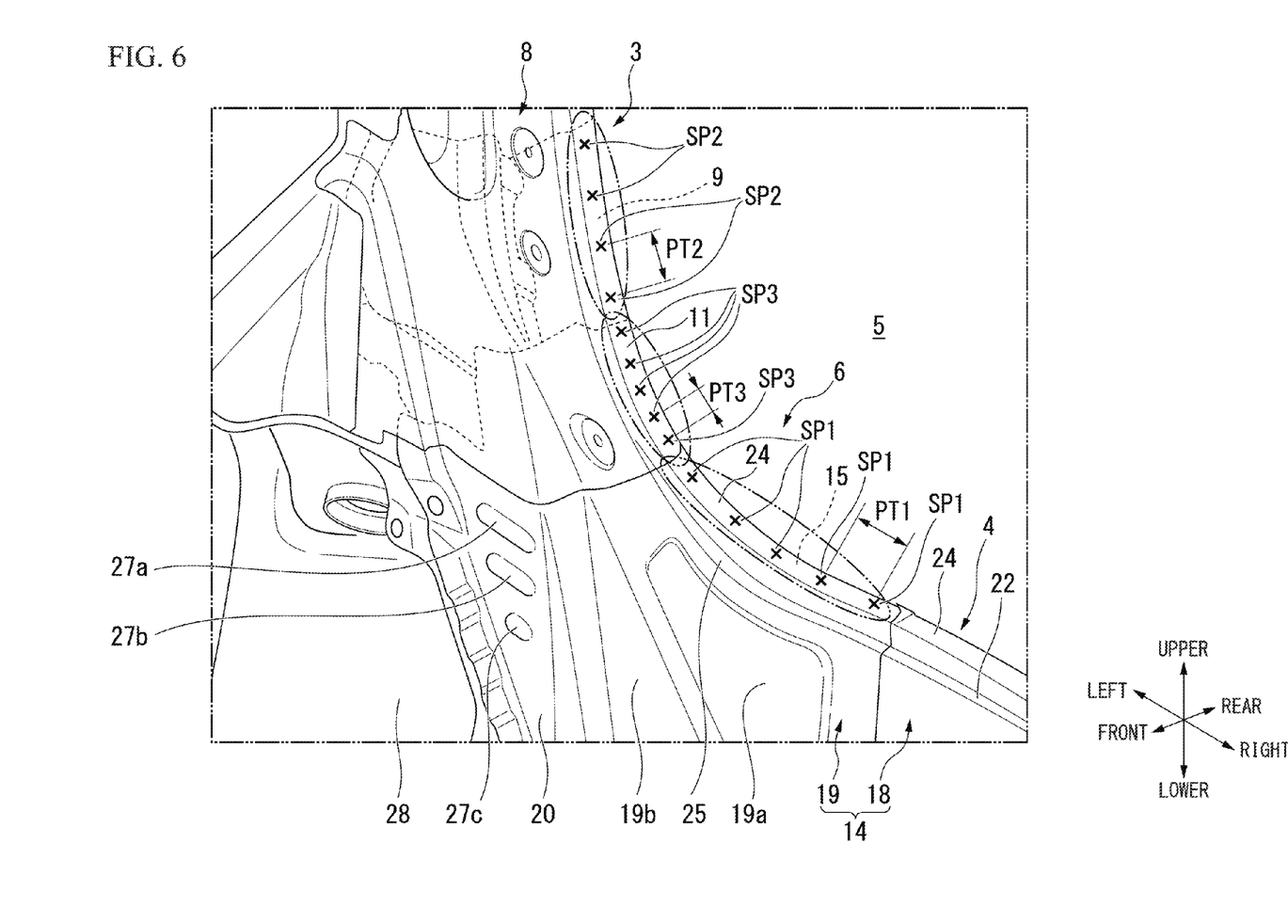
FIG. 6 is an explanation view of a joint state by spot welding of flanges according to an embodiment of the present invention.

Next, based on FIG. 6, a joint state by spot welding of the rear pillar inner flange 9, the rear pillar outer flange 11, the rear panel inner flange 15, and the second rear panel outer flange 24 is described in detail.

FIG. 6 is an explanation view of a joint state by spot welding of the flanges 9, 11, 15, and 24 and corresponds to FIG. 2.

As shown in FIG. 6, three spot weld parts SP1, SP2, and SP3 (X marks in FIG. 6), that are a first spot weld part SP1, a second spot weld part SP2, and a third spot weld part SP3 are formed in a region from the rear pillar 3 to the rear panel 4.

The first spot weld part SP1 is formed at a position where the rear panel inner flange 15 and the second rear panel outer flange 24 are overlapped to each other. The second spot weld part SP2 is formed at a position where the rear pillar inner flange 9 and the rear pillar outer flange 11 are overlapped to each other. The third spot weld part SP3 is formed at a position where the rear pillar inner flange 9, the second rear panel outer flange 24, and the rear pillar outer flange 11 overlap one another.

The number of each of the spot weld parts SP1 to SP3 is set, for example, as described below. In FIG. 6, the number of the first spot weld part SP1 is set to five, the number of the second spot weld part SP2 is set to four, and the number of the third spot weld part SP3 is set to five.

Note that, the number of each of the spot weld parts SP1 to SP3 is not limited to the above-described number and can be arbitrarily set.

A weld pitch PT1 (first weld pitch) of the first spot weld parts SP1 and a weld pitch PT2 (second weld pitch) of the second spot weld parts SP2 are set to substantially the same pitch. A weld pitch PT3 (third weld pitch) of the third spot weld parts SP3 is set to a pitch that is shorter than the weld pitches PT1, PT2. Specifically, the weld pitches PT1, PT2 are set to about 25 mm. The weld pitch PT3 is set to about 16.5 mm.

As the welding order of the spot weld parts SP1, SP2, and SP3, weld parts having the same weld pitch can be collectively welded. Therefore, as the welding order of the spot weld parts SP1, SP2, and SP3, for example, the first spot weld part SP1 and the second spot weld part SP2 are collectively formed first, and then, the third spot weld part SP3 is formed. Alternatively, the third spot weld part SP3 is formed first, and then, the first spot weld part SP1 and the second spot weld part SP2 are formed. In this way, the welding work can be efficient.

The Joule heat Q at the time of welding can be generally represented by the following expression.

$$Q = 0.24 \cdot I^2 \cdot r \cdot t$$

I: current, r: resistance, t: energization time

That is, if the weld pitch is narrow, when forming one weld point (hereinafter, referred to as a former weld point) and then forming the next weld point (hereinafter, referred to as a latter weld point), a branch current occurs at the former weld point, and a current that flows through the latter weld point is reduced. Therefore, in order to cover a current as the branch current, it is necessary to set the current I in the Joule heat expression to be large or set the energization time t to be long.

(Advantage)

As described above, in the present embodiment, when the door opening part 5 is formed by the rear pillar 3 and the rear panel 4, three flanges 9, 24, and 11 that are the rear pillar inner flange 9, the second rear panel outer flange 24, and the rear pillar outer flange 11 are overlapped to one another at a joint part of the second rear panel exterior 19 and the rear pillar 3 that configure the corner part 6 on which a stress of an impact such as at a rear impact time concentrates. Therefore, the rigidity of the corner part 6 can be enhanced.

Further, third spot weld part SP3 is formed at a position where three flanges 9, 24, and 11 are overlapped to one another, and the weld pitch PT3 of the third spot weld part SP3 is set to be narrower compared to other spot weld part SP1, SP2. Therefore, at the corner part 6, it is possible to distribute an impact received from the outside, to the spot weld parts (X marks in FIG. 6) at further narrow intervals. That is, it is possible to effectively distribute an impact received from the outside and enhance the resistance of the corner part 6 against the impact.

Accordingly, it is not necessary to provide a reinforcement member such as the reinforcement of the related art, and therefore, it is possible to enhance the rigidity of the corner part 6 without increasing the weight of the vehicle body 1.

Further, the rear panel exterior 14 is configured in a divided manner by the first rear panel exterior 18 that is arranged at the center in the vehicle width direction and the two second rear panel exteriors 19 that are arranged on both outer sides in the vehicle width direction of the first rear panel exterior 18, that is, at positions corresponding to the corner part 6.

Therefore, material costs when the rear panel exterior 14 is processed by a press working can be reduced compared to a case where the first rear panel exterior 18 and the second rear panel exterior 19 are integrally formed without configuring the rear panel exterior 14 in a divided manner. This is specifically described below.

Figure 7:
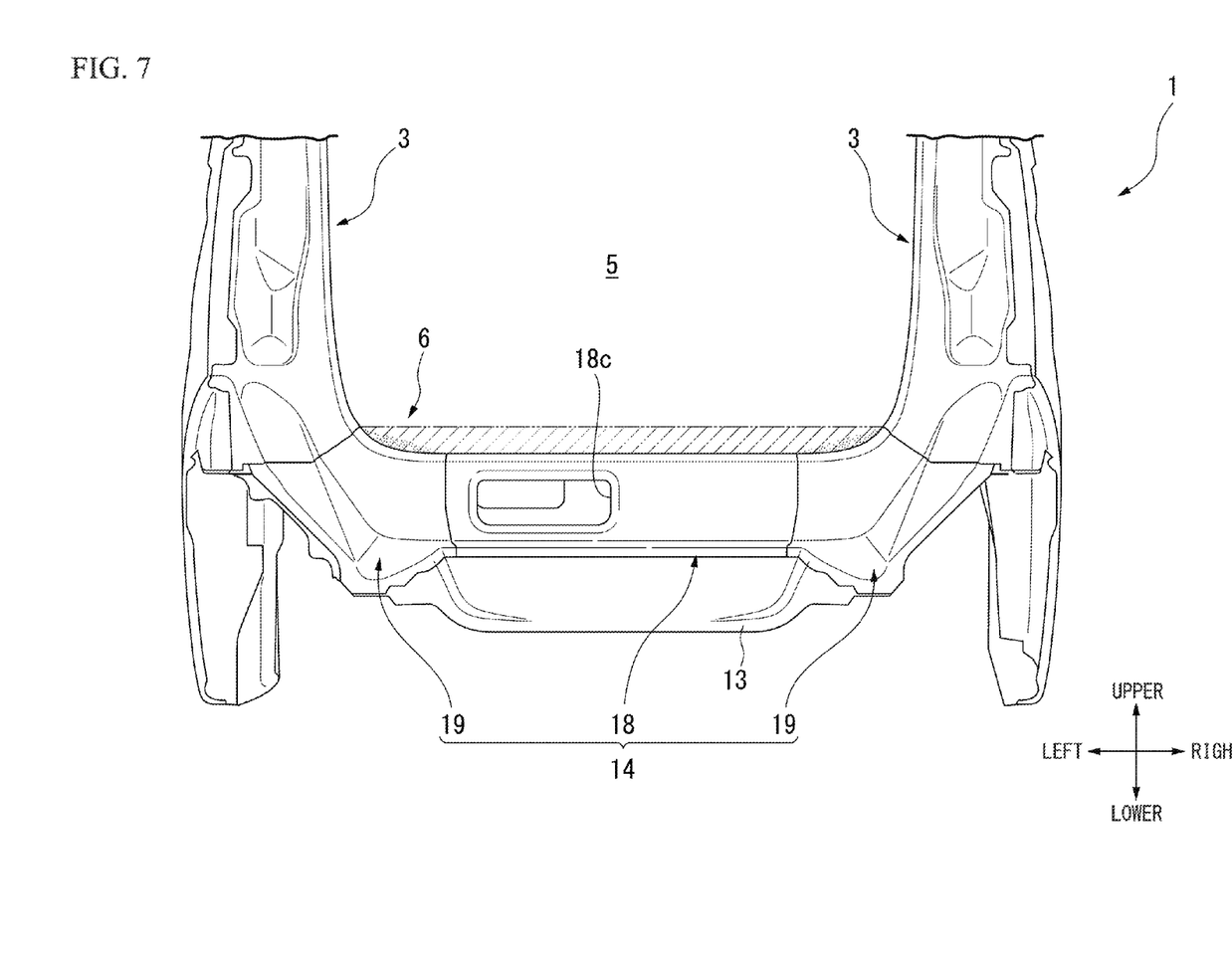
FIG. 7 is an explanation view when a rear panel exterior according to an embodiment of the present invention is processed by a press working.

FIG. 7 is an explanation view when the rear panel exterior 14 is processed by a press working.

As shown in FIG. 7, when the rear panel exterior 14 is not configured in a divided manner, a base material (blank when a base material is cut) required to process the rear panel exterior 14 by a press working is larger compared to a case where the rear panel exterior 14 is configured in a divided manner. Therefore, the hatch part represented by a two-dot chain line shown in FIG. 7 is a dead space when the rear panel exterior 14 is punched from a blank.

On the other hand, when the rear panel exterior 14 is configured in a divided manner, it is possible to separate a base material required to process the first rear panel exterior 18 by a press working and a base material required to process the second rear panel exterior 19 by a press working. Therefore, a base material can be made small by this quantity. As a result, the dot-hatch part shown in FIG. 7 is a dead space when the rear panel exterior 14 (the first rear panel exterior 18 and the second rear panel exterior 19) is punched from a blank.

In this way, by configuring the rear panel exterior 14 in a divided manner, the area of a dead space can be reduced compared to a case where the rear panel exterior 14 is not configured in a divided manner. Accordingly, it is possible to provide a rear panel exterior having a good yield rate at a press working.

Further, by configuring the rear panel exterior 14 in a divided manner, the plate thicknesses of the first rear panel exterior 18 and the second rear panel exterior 19 can be made different from each other. For example, in the present embodiment, the plate thickness of the first rear panel exterior 18 is set to 0.6 mm, and the plate thickness of the second rear panel exterior 19 is set to 1 mm.

In this way, it is possible to set the plate thickness of the second rear panel exterior 19 to be thick, and it is possible to improve the rigidity and strength. That is, it is possible to set the plate thickness of the corner part 6 on which a stress of an impact such as at a rear impact time concentrates to be thick, and it is possible to improve the rigidity and strength. On the other hand, and it is possible to set the plate thickness of the first rear panel exterior 18 that does not require high rigidity and strength compared to the corner part 6 to be thin, and the weight can be reduced.

Further, the outer end part in the vehicle width direction of the second rear panel exterior 19 extends upward and more outward in the vehicle width direction than the outer end part in the vehicle width direction of the rear panel interior 13 and is in a state where the outer end part of the second rear panel exterior 19 is interposed between the rear pillar interior 7 and the rear pillar exterior 8. Three of the rear pillar inner flange 9, the second rear panel outer flange 24, and the rear pillar outer flange 11 are collectively joined to one another by spot welding (third spot weld part SP3).

In this way, the divided and downsized second rear panel exterior 19 is extended upward and outward in the vehicle width direction, and thereby it is possible to obtain a shape of the second rear panel exterior 19 having a good yield rate and reduce costs.

That is, when a rear panel interior 13 that is not divided is extended outward in the vehicle width direction and upward in the gravity direction, or when the rear pillar interior 7 or the rear pillar exterior 8 is extended inward in the vehicle width direction and downward in the gravity direction, a shape having a bad yield rate is obtained. When the rear panel interior 13 and the rear panel exterior 14 are formed, the area of a dead space of a blank when a base material is cut is enlarged. As a result, material costs are increased. However, the divided and downsized second rear panel exterior 19 is extended upward and outward in the vehicle width direction, and thereby it is possible to reduce costs.

Further, the bead 10 is formed in the vicinity of the rear pillar inner flange 9. The bead 12 is formed in the vicinity of the rear pillar outer flange 11. The beads 16, 17 are formed in the vicinity of the rear panel inner flange 15. The bead 22 is formed in the vicinity of the first rear panel outer flange 21. The bead 25 is formed in the vicinity of the second rear panel outer flange 24.

According to such a configuration, the rigidity and strength of the flanges 9, 11, 15, 21, and 24 can be improved. Accordingly, the plate thicknesses of the rear pillar 3 and the rear panel 4 are not increased too much, and it is possible to provide a vehicle body 1 having a light weight, high rigidity, and high strength.

Note that, the present invention is not limited to the embodiment described above and includes embodiments in which a variety of modifications is made to the embodiment described above without departing from the scope of the present invention.

For example, in the above embodiment, a case is described in which the vehicle body 1 is a so-called wagon-type vehicle body, and the door opening part 5 is formed by joining a lower end of the rear pillar 3 and an outer end in the vehicle width direction of the rear panel 4. However, the embodiment is not limited thereto; and it is possible to employ the above embodiment for a variety of vehicle types in which the door opening part 5 is formed by joining the lower end of the rear pillar 3 and the outer end in the vehicle width direction of the rear panel 4.

Further, in the above embodiment, a case is described in which the plate thickness of the first rear panel exterior 18 is set to 0.6 mm, and the plate thickness of the second rear panel exterior 19 is set to 1 mm. However, the embodiment is not limited thereto; and it is possible to arbitrarily set the plate thickness of the first rear panel exterior 18 and the plate thickness of the second rear panel exterior 19.

Further, in the above embodiment, a case is described in which the weld pitch PT1 of the first spot weld part SP1 and the weld pitch PT2 of the second spot weld part SP2 are set to about 25 mm and the weld pitch PT3 of the third spot weld part SP3 is set to about 16.5 mm. However, the embodiment is not limited thereto; and it is possible to arbitrarily set the weld pitches PT1, PT2, and PT3 as long as the weld pitch PT3 is set to be shorter compared to the weld pitch PT1 and the weld pitch PT2.

In the above embodiment, a case is described in which the second rear panel exterior 19 is interposed between the rear pillar interior 7 and the rear pillar exterior 8 and three of the rear pillar inner flange 9, the second rear panel outer flange 24, and the rear pillar outer flange 11 are collectively joined to one another by spot welding. However, the embodiment is not limited thereto; and at least three of the rear pillar inner flange 9, the rear pillar outer flange 11, the rear panel inner flange 15, and the second rear panel outer flange 24 may be overlapped with one another at the corner part 6 and the overlapped regions may be joined to one another by spot welding.

DESCRIPTION OF THE REFERENCE SYMBOLS

1: vehicle body
3: rear pillar
4: rear panel
5: door opening part
6: corner part
7: rear pillar interior
8: rear pillar exterior
9: rear pillar inner flange
10, 12, 16, 17, 22, 25: bead
11: rear pillar outer flange
13: rear panel interior
14: rear panel exterior
15: rear panel inner flange
18: first rear panel exterior
19: second rear panel exterior
21: first rear panel outer flange (rear panel outer flange)
24: second rear panel outer flange (rear panel outer flange)
PT1, PT2, PT3: weld pitch
SP1: first spot weld part
SP2: second spot weld part
SP3: third spot weld part

The invention claimed is:

1. A vehicle body rear part structure comprising:
a rear panel that extends in a vehicle width direction at a vehicle body rear part;
a rear pillar that stands upward from an outer end part in the vehicle width direction of the rear panel; and
a corner part that is formed at a joint part between the rear panel and the rear pillar, wherein:
a door opening part is formed by the rear panel, the rear pillar, and the corner part;
the rear panel comprises a rear panel interior on the inner side of a vehicle interior and a rear panel exterior on the outer side of the vehicle interior;
the rear pillar comprises a rear pillar interior that stands upward in a gravity direction and that has a lower end in the gravity direction which is joined to an outer end part in the vehicle width direction of the rear panel interior, and a rear pillar exterior that stands upward in the gravity direction and that has a lower end in the gravity direction which is joined to an outer end part in the vehicle width direction of the rear panel exterior;
the rear panel interior comprises a rear panel inner flange that extends toward the vehicle body rear from an upper end part in the gravity direction of the rear panel interior;
the rear panel exterior comprises a rear panel outer flange that extends along the rear panel inner flange;
the rear pillar interior comprises a rear pillar inner flange that extends toward the vehicle body rear from an inner end part in the vehicle width direction of the rear pillar interior;
the rear pillar exterior comprises a rear pillar outer flange that extends along the rear pillar inner flange;
a plurality of first spot weld parts that join together the rear panel inner flange and the rear panel outer flange by spot welding are provided at a first weld pitch along a circumferential direction of the door opening part;
a plurality of second spot weld parts that join together the rear pillar inner flange and the rear pillar outer flange by spot welding are provided at a second weld pitch along a circumferential direction of the door opening part;

at the corner part, a plurality of third spot weld parts that join together, by spot welding, regions of the rear panel inner flange, the rear panel outer flange, the rear pillar inner flange, and the rear pillar outer flange where at least three of the flanges overlap with one another are provided at a third weld pitch along a circumferential direction of the door opening part; and the third weld pitch is set to be shorter than the first weld pitch and the second weld pitch.

2. The vehicle body rear part structure according to claim 1, wherein the rear panel exterior is configured in a divided manner by a first rear panel exterior on the center side in the vehicle width direction and a second rear panel exterior that is joined to an outer end part in the vehicle width direction of the first rear panel exterior.

3. The vehicle body rear part structure according to claim 2, wherein a plate thickness of the second rear panel exterior is set to be greater than a plate thickness of the rear pillar exterior and a plate thickness of the first rear panel exterior.

4. The vehicle body rear part structure according to claim 2, wherein the outer end part in the vehicle width direction of the second rear panel exterior extends upward in the gravity direction and more outward in the vehicle width direction than the outer end part in the vehicle width direction of the rear panel interior, and the third spot weld part is provided at the outer end part of the second rear panel exterior in a state where the outer end part of the second rear panel exterior is interposed between the rear pillar interior and the rear pillar exterior.

5. The vehicle body rear part structure according to claim 3, wherein the outer end part in the vehicle width direction of the second rear panel exterior extends upward in the gravity direction and more outward in the vehicle width direction than the outer end part in the vehicle width direction of the rear panel interior, and the third spot weld part is provided at the outer end part of the second rear panel exterior in a state where the outer end part of the second rear panel exterior is interposed between the rear pillar interior and the rear pillar exterior.

6. The vehicle body rear part structure according to claim 1, wherein a bead is formed in the vicinity of each of the rear panel inner flange, the rear panel outer flange, the rear pillar inner flange, and the rear pillar outer flange along the extending direction of each flange.

* * * * *